Figure 2:
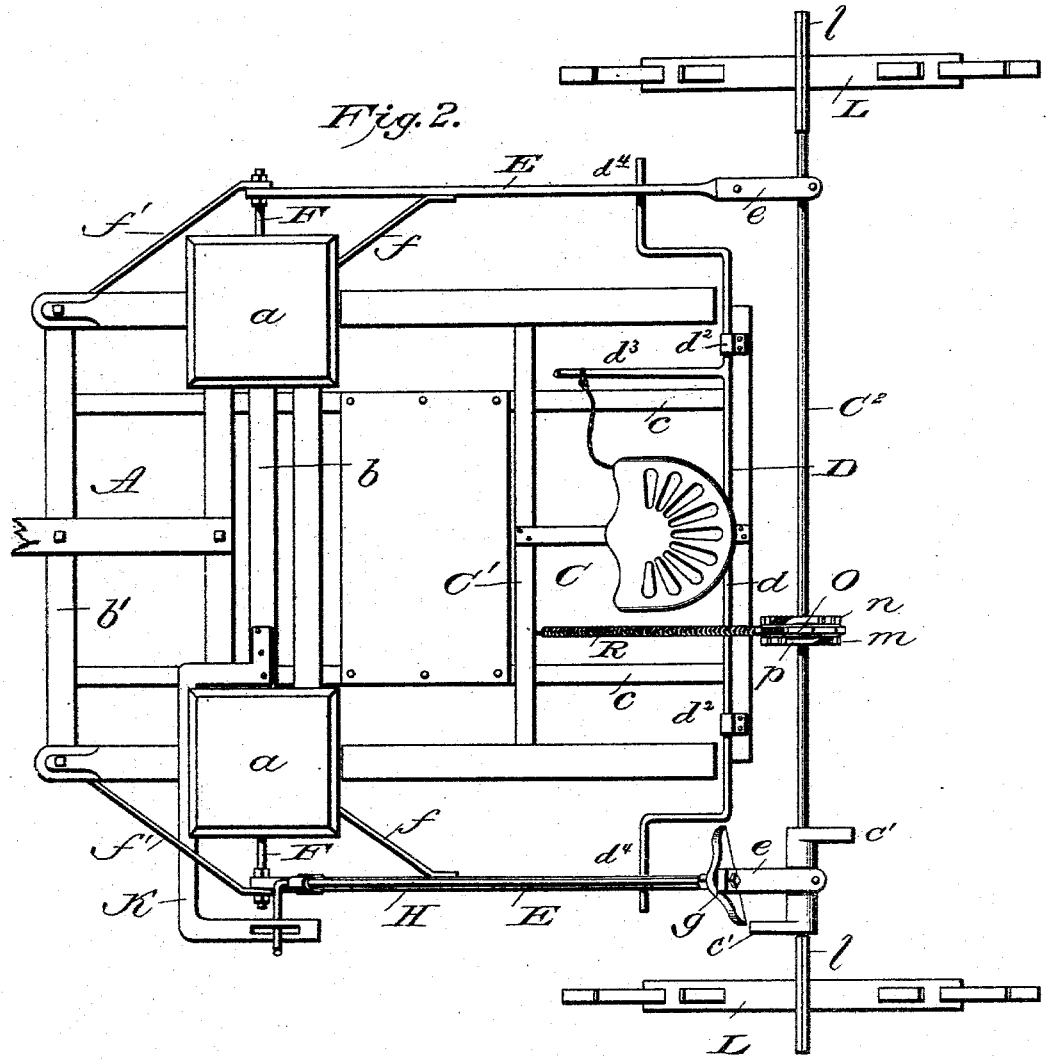

(No Model.)  2 Sheets—Sheet 1.
L. J. LINDSEY.
CORN PLANTER.
No. 494,926. Patented Apr. 4, 1893.
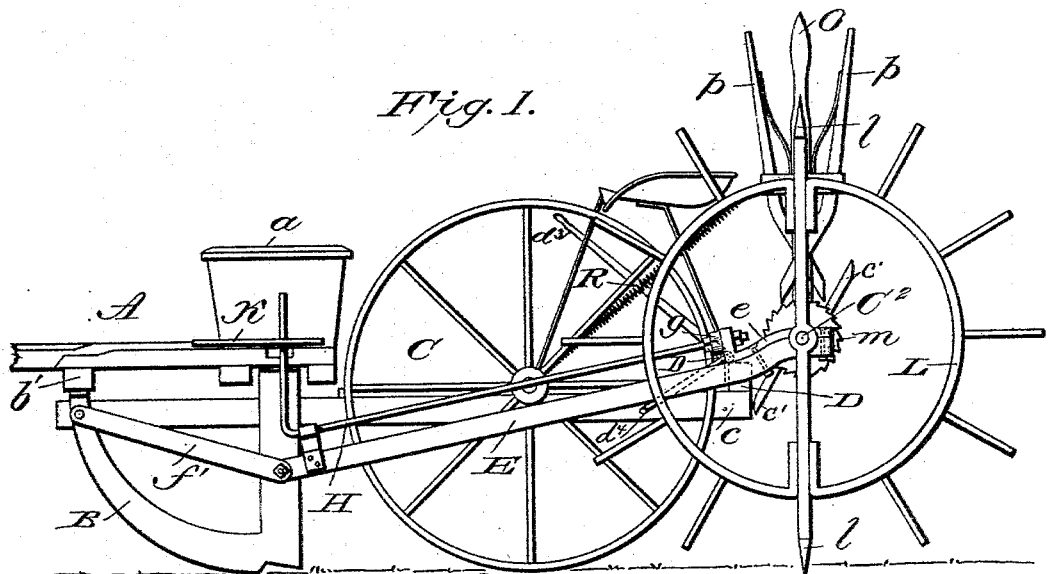
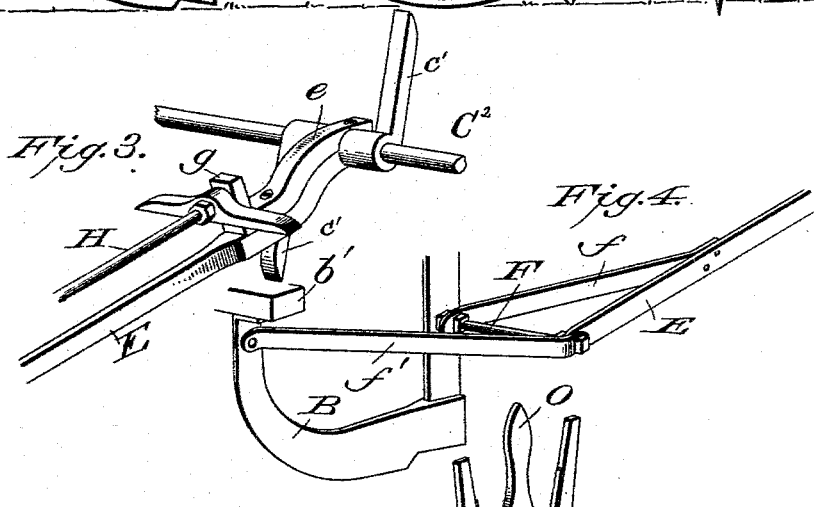
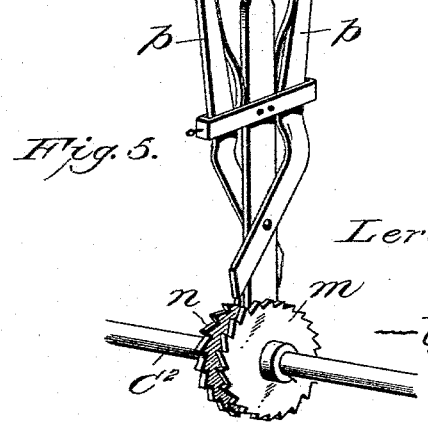
Leroy J. Lindsey,
Inventor (No Model.) 2 Sheets—Sheet 2.

L. J. LINDSEY.
CORN PLANTER.

No. 494,926. Patented Apr. 4, 1893.

Witnesses

Leroy J. Lindsey.
Inventor by
Attorney

UNITED STATES PATENT OFFICE.

LEROY JAMES LINDSEY, OF MOSCOW, IOWA.

CORN-PLANTER.

SPECIFICATION forming part of Letters Patent No. 494,926, dated April 4, 1893.

Application filed August 11, 1892. Serial No. 442,754. (No model.)

*To all whom it may concern:*

Be it known that I, LEROY JAMES LINDSEY, a citizen of the United States of America, residing at Moscow, in the county of Muscatine and State of Iowa, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in check row corn planters.

The object of the invention is to provide a planter having marking wheels which are rigidly attached to an axle, said axle being connected to the runners of the planter by bars so that there will be at all times the same distance between the marking wheels and heels of the runners, through which the seed is dropped; and the invention also provides a means for adjusting the marking wheels and communicating motion directly therefrom to the seed slide.

In the accompanying drawings, forming part of this specification: Figure 1 is a side view of a planter constructed in accordance with my invention. Fig. 2 is a plan view. Figs. 3, 4, and 5 are detail views.

A designates the front or runner frame of the planter, which carries the seed boxes $a\ a$, within which plays a reciprocating seed slide $b$, which slide is operated from the shaft which carries the marking wheels, as will be hereinafter fully set forth. The frame A has a suitable draft tongue, and to the front part of this frame is secured runners B, the rear vertical portions of said runners connecting with the seed boxes in the usual manner.

C designates the wheel carrying frame, the two main longitudinal beams $c\ c$ thereof being pivotally attached to the front cross-bar $b'$ of the frame A, said beams extending rearwardly under the cross-bars of the runner frame. The axle $C'$ has supporting wheels journaled thereon, said supporting wheels having broad treads, and are positioned so as to follow in the wake of the runners. The axle carries the driver's seat, and in front of said axle is a platform or foot-rest.

D designates the rear cross-bar of the frame C, said cross bar carrying suitable bearings $d^2$ for a shaft $d$ having bent ends $d^4$ which are adapted to engage with the bars connecting the axle with the runners when the arm $d^3$ rigidly attached to said shaft is elevated. The arm $d^3$ is provided with means for raising and lowering the same from the driver's seat.

E E designate bars which are pivotally attached to outwardly projecting arms F F carried by the runners and suitably braced by straps $f$ and $f'$, as shown. The rear ends of these bars are adapted to engage with the under side of the shaft $C^2$ between the arms $c'$ of the tappet, and to said bars are bolted fixtures $e$ which also partially embrace the shaft, and one or both of these fixtures is provided at its forward end with a lug $g$ forming bearing for a rock-shaft H. The forward end of this rock shaft is bent up and flattened to enter a slot formed in a plate or bar K which is connected with the seed slide as shown, so that when the shaft is rocked by the tappets a reciprocating motion will be given to the seed slide. The tappets are keyed on the shaft $C^2$ so as to project in opposite directions. The shaft carries the marking wheels L, which have projecting pins and wedge-shaped markers $l$. At an intermediate portion this shaft is provided with ratchet-wheels $m$ and $n$, the teeth of one wheel being inclined in an opposite direction from the teeth of the other, and between said ratchet-wheels is loosely pivoted a lever O, said lever carrying spring actuated pawls $p\ p$, which are held normally out of engagement with the ratchet teeth. The lever is connected to the cross piece $C'$ of the frame by a helical spring, R, which is of such a tension that it will normally hold the lever carrying the spring actuated pawls in a vertical position.

Having thus described the construction of my invention, the operation is as follows: When it is desired to set the planter, the operator can raise the side bars, which will bring the marking wheels out of contact with the ground, and can set them by manipulating the lever carrying the spring actuated pawls which engage with the ratchet-wheels, so as to set the marking wheels in proper position with respect to the seed slide. In transporting the machine the arm carried by the rockshaft located beneath the driver's seat can be elevated and thrown rearwardly to engage with the shaft carrying the marking wheels, and when in such position will hold the marking wheels elevated out of contact with the ground.

Having thus described my invention, what I claim as new, and desire to secure by Letters Patent, is—

1. In a corn planter, the combination of a runner frame having supporting wheels located in the rear of the runners, a transverse shaft pivotally connected to the runners below the seed boxes, said runners being provided with projecting bars F and brace bars $f$ and $f'$, the bars E having at their rear ends bearings for the transverse shaft $C^2$, said shaft carrying marking wheels and arms $c'$ for operating the seed dropping mechanism, ratchet disks having teeth arranged in opposite directions and a lever having pawls which are adapted to engage with said ratchet teeth, with means for holding the lever in a vertical position, for the purpose set forth.

2. In a corn planter, the combination of the marking wheels mounted on a transverse shaft, said shaft having ratchet wheels the teeth of which project in opposite directions, a lever loosely mounted on said shaft between said ratchet-wheels and provided with spring actuated pawls which are held normally out of engagement with said ratchet teeth, and a spring connected to the lever and to the runner frame for holding the lever normally in an upright position, for the purpose set forth.

3. In a corn planter, the combination of the runner frame having supporting wheels in the rear of the runners, outwardly projecting bars F attached to the vertical portion of the runners below the seed boxes, brace bar $f'$ extending from the bar F upwardly to the forward portion of the runner B, bars E E pivotally attached to the outwardly projecting bars F, a transverse shaft carrying marking wheels and tappets $c'$ pivoted to the rear ends of said bars, bearings attached to one of the bars E, a shaft H mounted in said bearings, said shaft carrying a transverse bar with which the tappets $c'$ engage, the forward end of the shaft engaging with a slotted plate carried by the seed slide, and a crank shaft mounted on the rear portion of the frame, said crank shaft being adapted to engage with the under side of the bars E E, the parts being organized substantially as shown, and for the purpose set forth.

In testimony whereof I affix my signature in presence of two witnesses.

LEROY JAMES LINDSEY.

Witnesses:
CHARLES KELLER,
NIMROD M. LOVE.